Oct. 4, 1955
A. E. FLETCHER
2,719,737
SHAFT SEAL
Filed Feb. 9, 1950
2 Sheets-Sheet 1
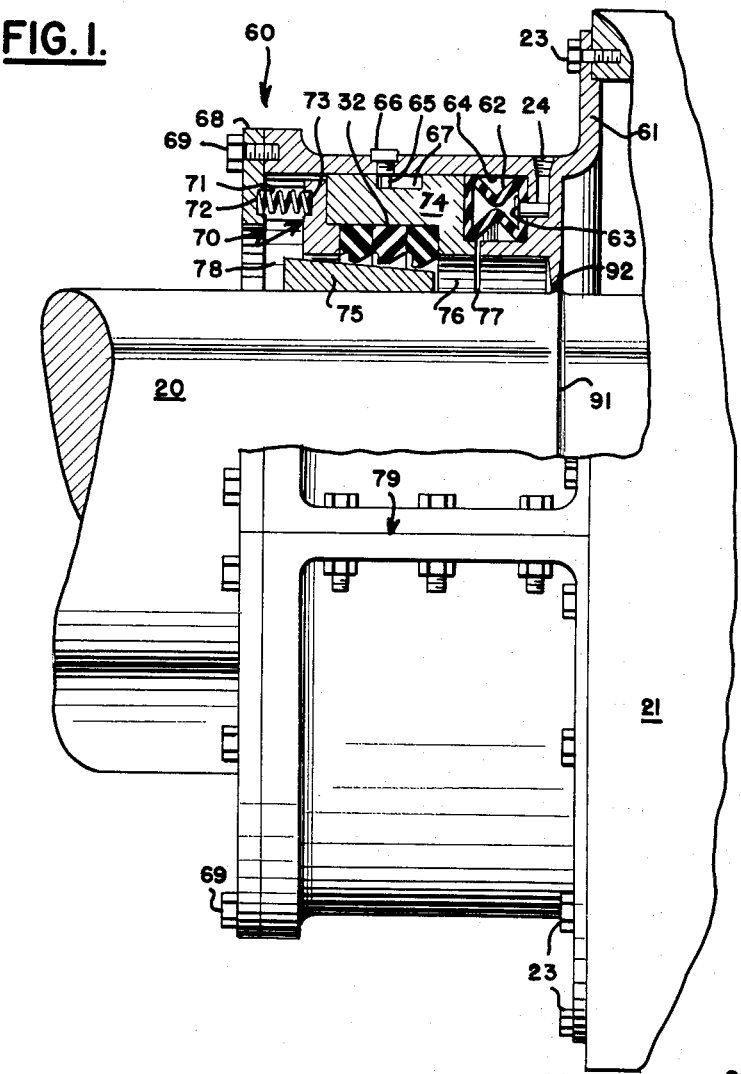
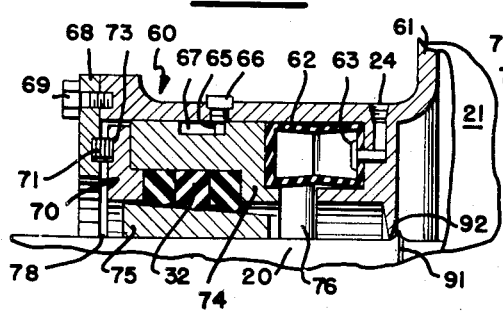
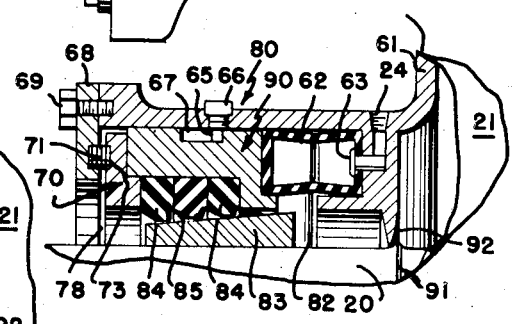
INVENTOR
ALBERT E. FLETCHER
BY
ATTORNEY Oct. 4, 1955  A. E. FLETCHER  2,719,737
SHAFT SEAL
Filed Feb. 9, 1950  2 Sheets-Sheet 2
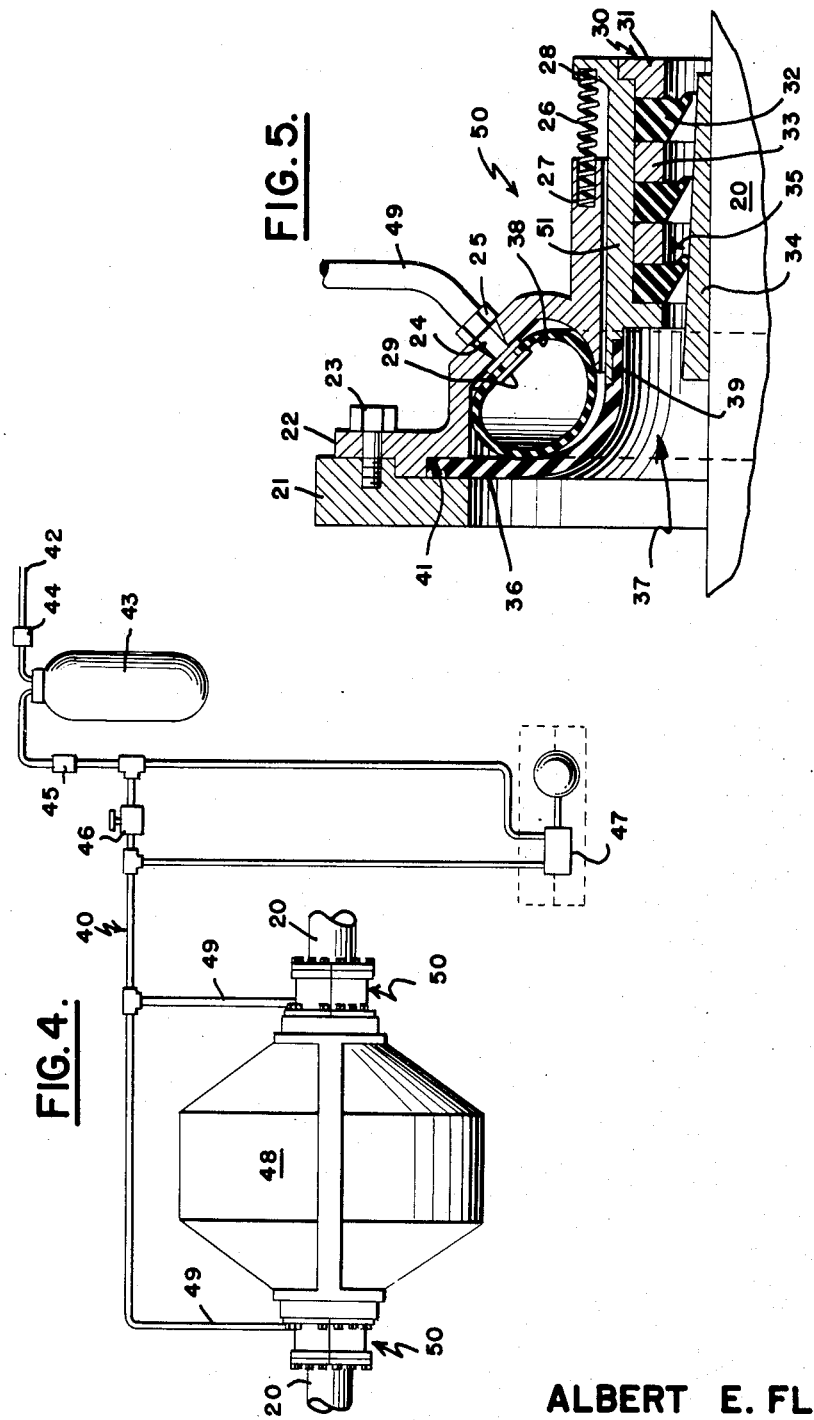
INVENTOR
ALBERT E. FLETCHER
BY *A.H.Helmstine*
ATTORNEY

United States Patent Office 2,719,737
Patented Oct. 4, 1955

2,719,737

SHAFT SEAL

Albert E. Fletcher, North Arlington, Va.

Application February 9, 1950, Serial No. 143,289

8 Claims. (Cl. 286—9)

(Granted under Title 35, U. S. Code (1952), sec. 266)

The invention described herein may be manufactured and used by or for the Government of the United States of America for governmental purposes without the payment of any royalties thereon or therefor.

This invention relates to shaft seals and more particularly to a non-frictional seal for a rotating shaft, automatically engaged by fluid pressure.

Prior shaft seals depend upon either maintaining frictional or rubbing contact, or supplying a continuous flow of a sealing medium or upon combinations of both. Continuous rubbing contact unescapably results in immediate power losses, and eventual excessive wear, requiring frequent replacement of packing or sealing rings during normal operation.

A principal object of the present invention is to provide a shaft seal automatically or manually engageable during the flooding of a ship's compartment.

Another object is to provide a seal wherein fluid pressure will tighten the seal around the shaft.

A further object is to provide a seal without rubbing contact during its normal operation, and with frictional contact only during emergency operation.

Other equally important objects and many additional advantages of the present invention become readily apparent from the following detailed description which illustrates preferred embodiments thereof when considered in connection with the accompanying drawings that diagrammatically represent in:

Figure 1, a fragmentary front elevation partly in vertical cross-section of my novel shaft seal in its normal operating position.

Figure 2, a like view showing the seal in the emergency operating position.

Figure 3, a modification showing a reverse arrangement of the wedge ring shown in Figure 2.

Figure 4, a diagrammatic view of a preferred pneumatic system for automatic operation of the present invention.

Figure 5, a further modification of the seal shown in Figures 1 and 2.

A preferred form of my invention as illustrated in Figure 1 wherein a shaft 20 rotates in bulkhead 21 and is arranged to be sealed by the bellows type seal-assembly 60. Assembly 60 is contained in sectional ring housing 61 attached to bulkhead 21 by bolts 23. The two sections of housing 61 are fastened together by bolts at the joint 79. The outer face of housing 61 is closed by annular cover plate 68 which is held thereon by bolts 69. Shaft 20 is provided with an oil-sling 91 arranged in cooperating relationship with the oil sling lip 92 on the housing 61.

A chamber 64 is provided in housing 61 for annular bellows 62, and an air inlet 24 is provided for one end of bellows 62 which is sealed to inlet 24 by fitting 63. One end of slide ring 74 is arranged for sliding engagement with the other end of bellows 62. The longitudinal movement of slide 74 is preferably limited by stud 65 arranged to engage slot 67 in slide 74. Stud 65 is provided with adjusting nut 66. Clearance at 77 is provided between housing 61 and slide 74, and clearance space 76 is provided under slide 74 for inclined wedge ring 75 which is mounted to rotate with shaft 20. Resilient sealing rings 32, preferably synthetic rubber, are mounted around wedge ring 75 for sliding longitudinal reciprocating travel along inclined ring 75 by means of slide 74 and retainer ring 70 which is held in resilient engagement with slide 74 and sealing rings 32 by means of spring 71, one end of which is mounted in recess 72 in plate 68 and the other end in recess 73 in ring 70. Retainer ring 70 is provided with clearance at 78 so that it may assume its rearward position as shown in Figure 2.

In Figure 2 the bellows 62 is shown in its distended position, spring 71 in its compressed position, and slide 74, rings 32, and retainer 70 in their rearward positions, whereby rubber sealing rings 32 are tightly compressed against inclined ring 75 which, as it rotates on shaft 20, is thereby provided with a water-tight shaft seal.

In Figure 3, a modified form of my invention is illustrated wherein the seal assembly 80 comprises the slide 90, retainer ring 70, spring 71, inclined wedge ring 83, rubber seal rings 84, mounted on inclined surface 85 of widge ring 83. Bellows 62 is shown in its distended position held in sealed connection with inlet 24 by fitting 63. Clearance 78 is provided between retainer ring 70 and plate 68, and clearance 82 is provided between wedge ring 83 and housing 61. Slide 90 is limited in its longitudinal reciprocations by means of stud 65 and slot 67.

In the modification just described and illustrated in Figure 3, the seals 84 are normally kept open by the maintained inflation of the annular bellows 62, and are closed by the action of the spring 71, only in an emergency or failure of the inflating air pressure at inlet 24. This modification is useful on shipboard where the air line might be severed by enemy fire or other causes.

Figure 4 illustrates a preferred automatic compressed air system for operating the present invention, wherein, for example, a gear assembly housing is indicated at 48 positioned in cooperating arrangement with shaft 20 and two of the diaphragm type of shaft seals 50 as illustrated in Figure 5, and which are indicated in Figure 4 as installed on shaft 20 on each side of housing 48.

A source of compressed air, or of other fluid is indicated at 42 in the system 40. The air preferably passes through check valve 44 and into storage tank 43, from which it is withdrawn through pressure regulator 45, through manually operated valve 46 and through conduits 49 to the inlets 24, shown in Figures 1, 2, 3 and 5. Automatic operation of the system 40 is preferably provided by float valve 47 which may be positioned in the ships compartment likely to be flooded, or in any other position where fluid level operation of float valve 47 is desired.

Another modification of the present invention is illustrated in Figure 5 and embodies an annular inflatable rubber tube 38 and an elastic annular diaphragm 36, in place of the annular bellows members shown in Figures 1, 2 and 3.

In Figure 5 the shaft 20 is shown passing through bulkhead 21; mounted on and rotating with shaft 20 is inclined wedge ring 34. Bolted to bulkhead 21 by bolts 23 is shaft seal housing 22. The outer margin of housing 22 is held in resilient engagement with retainer ring 31 by spring 26 having one end mounted in recess 28 in slide 51 and the other end mounted in recess 27 in housing 22. The slide assembly indicated at 30 comprises the slide ring 51, the rubber seal rings 32 surrounding wedge ring 34, the spacer rings 33, and the retainer ring 31. One end of elastic annular diaphragm 36 is attached at 41 to housing 22 and the other end of diaphragm 36 is attached at 39 to slide ring 51. Mounted in operating engagement with diaphragm 36 is annular elastic tube 38 sealed by fitting 29 in communication with inlet 24. Conduit 49 is sealed in communication with inlet 24 by fitting 25. A clearance space 37 is provided for the operation of diaphragm 36 and slide 51.

OPERATION

Example I

The embodiment of the present invention illustrated in Figures 1 and 2 operates as follows. In normal operation the seal 60 is in the position shown in Figure 1 wherein there is a non-friction and non-rubbing engagement between the rubber seal rings 32 and the inclined wedge ring 75 as it rotates with shaft 20.

However, if fluid pressure is applied at inlet 24, either manually, or by valve 46, or automatically by float valve 47, the following sequence of operations occurs: Bellows 62 is inflated into its expanded position as shown in Figure 2. This expansion pushes slide 74 outwardly toward plate 68 while slot 67 is engaged by stud 65, and while spring 71 is compressed into retracted position as shown in Figure 2 by the action of slide 74 against the sliding retainer ring 70. At the same time, slide 74 pushes the seal rings 32 up the inclined surface of wedge ring 75. This progressively forces rings 32 into the progressively restricted space between the upwardly inclined surface of wedge 75 and the relatively horizontal surface of the underside of slide 74. This progressively compresses rings 32 into tighter and tighter sealing contact with wedge ring 75, as shown in Figure 2. Whenever it is desired to resume normal operation valve 46 is released and the fluid pressure relieved in bellows 62 through outlet 24, and thereby the bellows 62 is released to resume its normal deflated position as shown in Figure 1. This causes spring 71 to expand and push ring 70, slide 74, and seal rings 32 inwardly toward bulkhead 21, and the assembly 60 resumes its normal operating position as shown in Figure 1 with bellows 62 collapsed and seal rings 32 again out of frictional or rubbing contact with wedge ring 75.

Example II

In the embodiment illustrated in Figure 3, the operation is as follows: In normal operation fluid pressure is constantly maintained through inlet 24 and in bellows 62 to hold bellows 62 constantly in its inflated position as shown in Figure 3. This causes spring 71 to remain in its retracted position and seal rings 84 to remain out of frictional or rubbing contact with the inwardly and upwardly sloping surface 85 of wedge ring 83. It should be noted here that in this embodiment the incline 85 slopes inwardly and upwardly toward bulkhead 21 which is in a direction exactly the reverse of that of the outwardly and upwardly sloping surface of the inclined wedge ring 75 of Figure 2.

In the modification of Figure 3, the float valve may be arranged to close instead of open at a given fluid level. Or, if desired, the pressure may be manually operated by hand valve 46. Or, if desired, the conduits 49 may be arranged to operate bellows 62 only if the conduits are severed by accident, or if the pressure in the line fails for some reason.

In any event, when pressure is removed from inlet 24 bellows 62 will collapse. This will release pressure on spring 71 which will expand and force ring 70, slide 90, and seal rings 84 to slide upwardly on slope 85 toward bulkhead 21, and thereby progressively compress rings 84 into a tighter and tighter seal between surface 85 and the relatively horizontal under surface of slide 90. This provides the progressive water-tight seal for shaft 20 in a manner equally advantageous to that previously described in Example I.

Example III

The embodiment illustrated in Figure 5 preferably operates as follows: When fluid pressure is applied through conduit 49 and inlet 24, tube 38 is inflated and expands, causing diaphragm 36 to expand or bulge into space 37. This expansion causes diaphragm 36 to pull slide 51 and ring 31 affixed thereto, inwardly toward bulkhead 21. This causes ring 31 to compress seal rings 32 between spacers 33 and into tighter and tighter sealing engagement between the inwardly inclined surface of wedge ring 34 and the relatively horizontal under surface of slide 51. When the emergency is over, or when it is desired, the pressure is relieved at inlet 24, the tube 38 resumes its relatively deflated position as shown in Figure 5; elastic diaphragm 36 returns to its un-distended position, and spring 26 retracts and pulls slide 51, ring 31, seal rings 32, spacers 33, back into their normal operating position wherein seal rings 32 are again out of frictional or rubbing contact with the inclined surface of wedging ring 34.

While the present invention is primarily advantageous for use in a ship's compartment wherein a seal is desired only in case of flooding of the compartment, it is apparent that my novel seal may be applied with equal advantage to other uses such as shafted machinery and similar installations ashore and afloat.

It is preferred to make the metal parts of the present invention of bronze or corrosion resisting steel, and the seal rings 32 and 84, and the diaphragm 36 of synthetic or natural rubber or similar resilient material.

While only preferred embodiments of the present invention have been disclosed herein, it is obvious that various modifications and embodiments may be resorted to by those skilled in the art without departing from the spirit and scope of the appended claims, wherein I claim:

1. A shaft seal assembly for a rotating shaft, said assembly comprising in combination, a conical shaped wedge ring secured to and arranged to rotate with said shaft, a housing for enclosing said shaft, a movable slide ring adapted to bear at its outer side against the inner periphery of said housing, means securing a concentric sealing ring on the inner side thereof, means positioning said slide ring and attached sealing ring in spaced relation to but out of contact with said wedge ring, an expansible element fitted to one side of said slide ring so that movement of said expansible element moves said slide ring and attached sealing ring into engagement with said wedge ring thus forming a seal between said slide ring and said rotating shaft.

2. A shaft seal assembly for a rotating shaft comprising an annular member affixed to said shaft, said annular member having its entire exterior surface shaped in the form of a frustum of a right circular cone, a housing enclosing said shaft, a slide member movably mounted in said housing and having its outer surface bearing against the inner peripheral portion of said housing, means attaching a concentric sealing ring to the inner side of said slide member, means coacting with said slide member for maintaining said sealing ring in a position surrounding but in non-frictional relationship with said annular member, and moving means in contact with said slide member for longitudinally moving said slide member and its attached sealing ring into engagement with said annular member thereby forming a seal between said slide member and said shaft.

3. The combination according to claim 2 wherein said moving means in contact with said slide member comprises resilient means.

4. The combination according to claim 2 wherein said moving means in contact with said slide member comprises pneumatic means.

5. The combination according to claim 2 wherein said moving means comprises pneumatic means for moving said slide member, a float actuated valve, means connecting said float actuated valve with said pneumatic means, whereby movement of said valve actuates said pneumatic means for moving said slide member into engagement with said annular member.

6. In combination, a shaft seal comprising a rotatable shaft, an outwardly sloping conical wedge ring affixed to said rotatable shaft, a housing for enclosing said shaft, means positioning said housing in spaced relation to said shaft, a concentric compressible sealing ring, a movable slide ring, means securing said concentric sealing ring to the inner surface thereof for positioning said sealing ring around said wedge ring, pneumatic means including an air actuated expansible bellows connected with said slide ring at one side thereof normally maintaining the latter out of engagement with said wedge ring, and an expansible element for selectively moving said sealing ring into engagement with said conical wedge ring so as to form a seal between said slide ring and said rotatable shaft.

7. The combination according to claim 6 wherein said expansible element comprises a spring.

8. The combination according to claim 6 in which said slide ring has its outer surface bearing against the inner periphery of said housing.

References Cited in the file of this patent

UNITED STATES PATENTS

| | | |
|---|---|---|
| 1,575,818 | Carrier | Mar. 9, 1926 |
| 1,914,741 | Gysling | June 20, 1933 |
| 2,033,796 | Weinschenker | Mar. 10, 1936 |
| 2,133,304 | Nichols | Oct. 18, 1938 |
| 2,285,007 | Brenner et al. | June 2, 1942 |
| 2,328,676 | Rich | Sept. 7, 1943 |
| 2,556,393 | Holben | June 12, 1951 |

FOREIGN PATENTS

| | | |
|---|---|---|
| 120,982 | Sweden | of Feb. 1948 |
| 556,256 | Great Britain | Sept. 27, 1943 |
| 582,138 | Germany | Aug. 9, 1933 |
| 691,953 | Germany | June 8, 1940 |